Aug. 28, 1956

C. J. MANN 2,760,781

SLUDGE-REPELLING COLLET

Filed June 4, 1952

Inventor
Charles J. Mann
-By-
Attorney

United States Patent Office 2,760,781
Patented Aug. 28, 1956

2,760,781

SLUDGE-REPELLING COLLET

Charles J. Mann, Traverse City, Mich.

Application June 4, 1952, Serial No. 291,653

1 Claim. (Cl. 279—41)

The present invention relates to collet construction, a collet being a device for holding rotating workpieces in the spindle of equipment such as a lathe or screw machine, or for holding replaceable rotary tools. It is of primary importance in all these situations to maintain the rotation of the workpiece or the tool, as the case may be, at a minimum of eccentricity. It is also important to maintain a secure grip on the part of the collet against the object engaged by it. Both of these requirements make it important that a very minimum amount of foreign material should lodge between the gripping surfaces of the collet and the tool or workpiece. Chips falling away from the cutting tool, and surface scale or foreign material adhering to the outer surface of the object held, will seriously interfere with the functioning of the collet. Conventional collet construction provides for a series of axially-extending fingers separated one from another by slots of sufficient length to create a spring action. The gripping portion of the collet is disposed at the outer extremity of these resilient fingers, and the gripping surfaces are forced into engagement with the tool or workpiece by a wedging action taking place between surfaces on the collet and on the spindle of the machine. It is important to note that the slots separating the resilient fingers of the collet provide a passageway from the area of the machine at which the cutting action is taking place into the interior of the collet. The tendency of particles of foreign material to lodge in this area and also in and around the clamping surfaces of the collet will tend to displace the rotary tool or workpiece held by the collet from the true axis of rotation and create eccentricity.

One of the factors primarily responsible for the urging of foreign particles into the interior of the collet is the jet of cutting fluid that is customarily used in conjunction with the machine. Particularly in operations in which a tool is operating in close proximity to the face of the collet, the jet of coolant splashes against the workpiece and the front of the collet with sufficient velocity to urge such particles into whatever recesses present themselves in the face of the collet and spindle. The presence of the axial slots into the interior of the collet provide easy passage for particles under the urging of the flow of coolant. The primary object of the present invention is to so form the face of the collet as to inhibit the tendency of the coolant jet to force such foreign material into the collet in this manner. The formation of the face of the collet is such as to repel the jet of coolant and whatever particles may be carried by it. The action of a collet formed according to the principles of the present invention is similar to that which would take place if a stream of liquid were projected upstream into a fan. A very small portion of the liquid would get past the fan, most of it being repelled by the blades and by the draft established by them. While there is very little actual flow of air induced by the present invention due to the presence of surrounding structure on the machine, the effect upon the fluid projected directly against the face of the collet is definitely similar.

The several features of the present invention will be discussed in detail through an analysis of the particular embodiments illustrated in the accompanying drawings. In these drawings.

Figure 1:
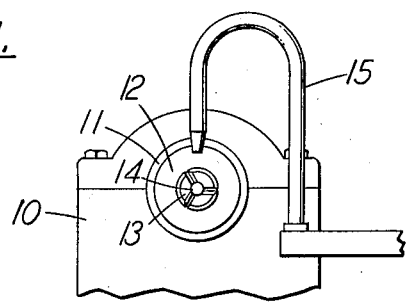
Figure 1 illustrates a view taken on a plane perpendicular to the axis of rotation of a lathe spindle, showing a collet and a coolant conduit in the usual position.

Referring to the drawings, the head stock 10 of a lathe or similar machine is shown of conventional form, and a bearing 11 is firmly secured in position by the surrounding structure. A spindle 12 is rotatably mounted within the bearing 11, and carries the collet indicated at 13. A workpiece 14 is held in position by the collet, and is rotatably driven against a tool (not shown) to perform a conventional machining operation. A conduit 15 is disposed to direct a jet of coolant directly at the point of engagement of the workpiece 14 by the cutting tool.

Figure 2:
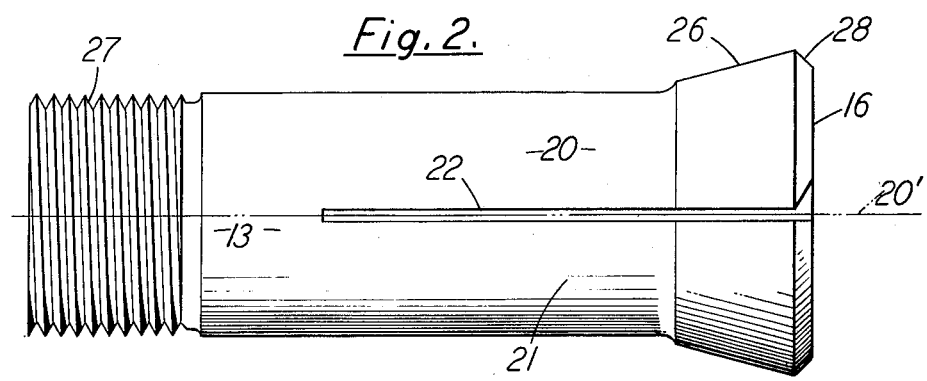
Figure 2 is an enlarged side elevation of a collet formed according to the present invention.
Figure 4:
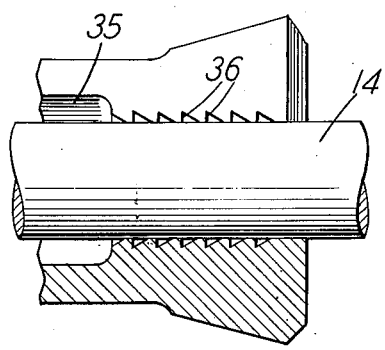
Figure 4 is a section taken on the plane 4—4 of Figure 3.
Figure 3:
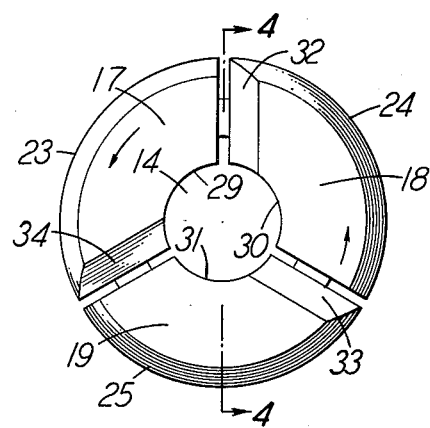
Figure 3 is a view of the front face of a collet similar to that shown in Figure 2.

Referring to Figures 2 through 4, inclusive, the collet 13 is shown on an enlarged scale. The front face 16 of the collet 13 is composed of the three surfaces 17, 18, and 19 disposed in a plane substantially perpendicular to the axis 20', as is conventional practice. These surfaces 17, 18, and 19 are each associated with separate resilient arms such as those indicated at 20 and 21 in Figure 2, these arms being separated by slots as referred to at 22. At the outer end of the resilient arms, the jaws 23, 24, and 25 are provided with annular outer bevelled surfaces as indicated at 26. The surfaces 26 on each of the jaws 23, 24, and 25 are engaged by a similar internal conical surface formed on the spindle 12 of the machine. The threaded end 27 is engaged by a suitable tubular member (not shown) positioned by the mechanism of the machine in such a fashion as to pull the collet 13 axially inward with respect to the spindle, causing the tapered surface 26 to force the jaws 23, 24, and 25 radially inward upon the workpiece 14. The bevelled surfaces 26, the inner portions of the slots 22, and the threaded end 27 of the collet are standard, and form no part of the present invention. In addition to the faces 17, 18, and 19, on the jaws 23, 24, and 25, respectively, the outer face of the collet is provided with a bevelled outer periphery 28 so as to present a more rounded contour. The provision of bevelled outer edges on the jaws of the collet is also conventional practice.

The outer face of the collet also is provided with a series of deflecting surfaces formed as a part of each jaw. These surfaces are preferably arranged as shown to extend from the inner bearing surfaces 29, 30, and 31 of the jaws outward, and these surfaces are inclined to a plane perpendicular to the axis of the collet, and are substantially helical in the propeller sense (the axis of the helix being coaxial with the axis 20). This inclination, and the position of the deflecting surfaces 32, 33, and 34 at the leading edges of the respective jaws are selected for a desired direction of rotation of the spindle (indicated by the arrow in Figure 3) to establish a tendency to repel material projected axially against these portions, and result (in the preferred form) in displacing the leading edge of a jaw axially inward from the opposite point (trailing edge) of the adjacent jaw. The action of the surfaces 32, 33, and 34 is similar to that of a propeller. This action is such that the rotating movement of the collet will tend to induce an axial movement of coolant fluid and foreign particles away from the face 16 so as to inhibit the tendency of such particles to enter the slots 22 and accumulate within the interior 35 of the collet and around the points of contact 36 on the bearing surfaces of the jaws.

The particular embodiments of the present invention have been shown and discussed herein for illustrative purposes only, and are not to be considered as a limitation upon the scope of the appended claim. In the claim, it is my intention to claim the entire invention except as I am limited by the prior art.

I claim:

A collet comprising a shank carrying securing means and a plurality of jaws having conical peripheral seat portions, said jaws being spaced by axial slots extending longitudinally thereof, each jaw having an arcuate inner bearing surface and a front face having a leding edge, said leading edge lying in a surface axially inclined to said front face; said surface intersecting said front face, the adjacent wall of one of said slots, and a substantial portion of said arcuate inner bearing surface; said surfaces defining blades for repelling material tending to enter said slots during rotation of said collet in one direction.

References Cited in the file of this patent

UNITED STATES PATENTS

| | | |
|---|---|---|
| 1,441,284 | Johnson et al. | Jan. 9, 1923 |
| 1,917,752 | Connell | July 11, 1933 |
| 2,214,241 | Baxendale | Sept. 10, 1940 |